United States Patent

[11] 3,602,618

| [72] | Inventor | Chester W. Michatek |
| | | Rochester, N.Y. |
| [21] | Appl. No. | 850,128 |
| [22] | Filed | Aug. 14, 1969 |
| [45] | Patented | Aug. 31, 1971 |
| [73] | Assignee | Sylvania Electric Products Inc. |
| | | Danvers, Mass. |

[54] MULTILAMP FLASH UNIT INCLUDING DAMPING STRUCTURE
4 Claims, 8 Drawing Figs.

[52] U.S. Cl. ............................................ 431/93,
240/1.3, 95/11.5
[51] Int. Cl. ........................................... F21k 5/02
[50] Field of Search ............................... 431/93–97

[56] References Cited
UNITED STATES PATENTS
2,427,969  9/1947  Lester ..................... 431/96 X
2,985,748  5/1961  Mendelsohn .................. 240/1.3
3,087,318  4/1963  Oswold ..................... 431/96 X Primary Examiner—Edward J. Michael
Attorney—Joseph C. Ryan ABSTRACT: A multilamp flash unit or flashcube supporting a plurality of flashlamps, each having associated striker wires for percussively firing the flashlamps, is provided with an actuator control or dampening ramp for effecting stepwise movement of an actuator into the unit upon indexing of the unit and for preventing accidental firing of the flashlamps upon such indexing. The flashcube is useable on a camera having a mechanical actuating member that sequentially is movable into the unit, upon indexing thereof, to sense the condition of and to fire successive flashlamps in the unit. The flashcube base and damping ramp are configured and adapted to be engaged by the actuating member upon cube indexing to control movement of the member in a stepwise manner into a nonreleasing or sensing position in contact with the flashlamp striker wire.

PATENTED AUG 31 1971

CHESTER W. MICHATEK
INVENTOR.

BY *J. Addison Mathew*
*Robert W. Hampton*
ATTORNEYS

3,602,618

CHESTER W. MICHATEK
INVENTOR.

BY Addison Matthews
Robert W. Hampton
ATTORNEYS

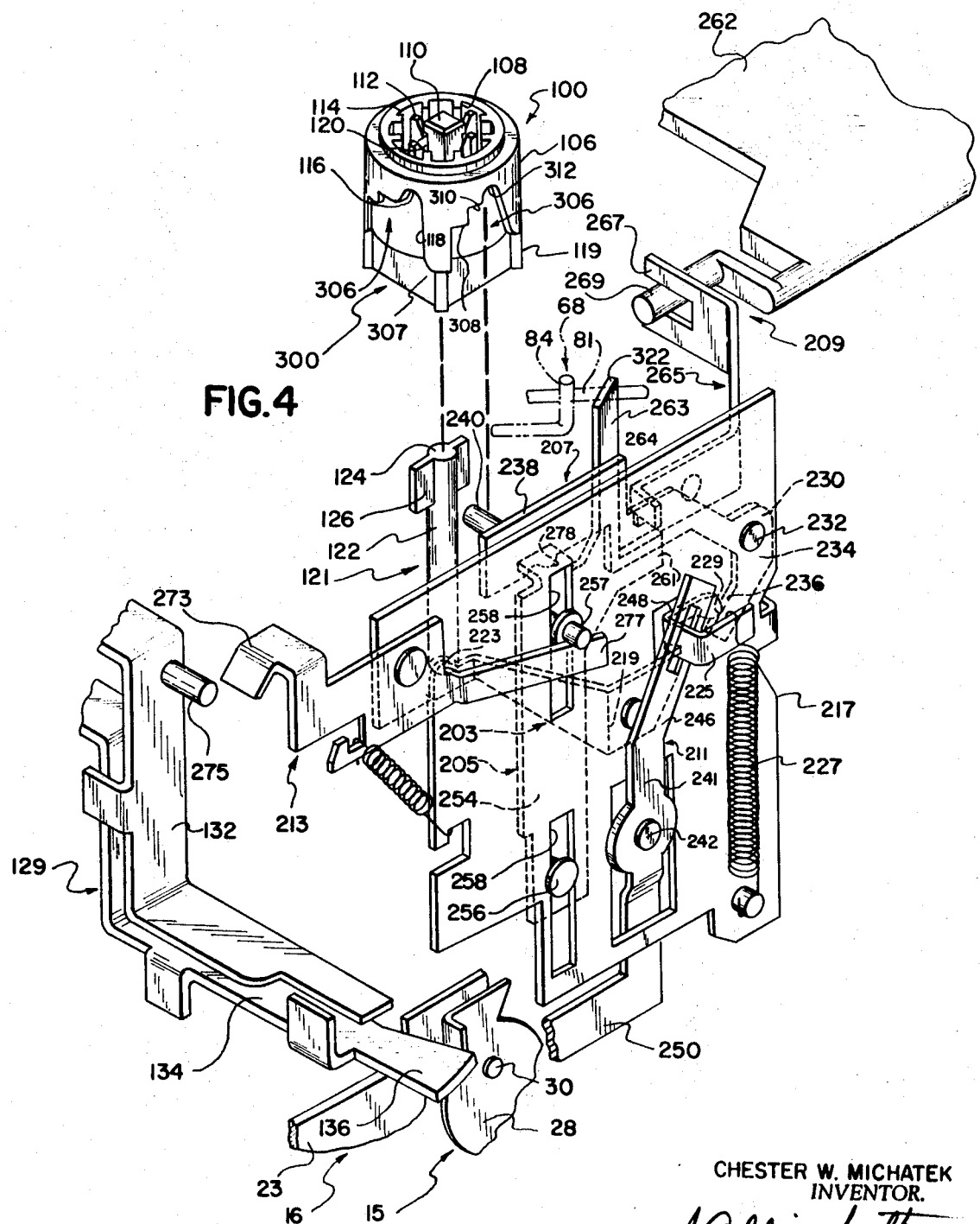

MULTILAMP FLASH UNIT INCLUDING DAMPING STRUCTURE

BACKGROUND OF THE INVENTION

The present invention relates to percussively ignitable photoflash lamps useable with camera mechanisms for mechanically sensing the condition of and/or for firing such flashlamps. More particularly, the invention relates to percussive flashlamps supported in a multilamp unit or flashcube having preenergized strikers for percussively firing the flashlamps, and to control or dampening means on the flashcube for moving a sensing and/or firing member into engagement with the striker without firing the flashlamp.

It is well known in the photographic art to provide cameras with electrical means for firing camera-mounted flashlamps and for sensing the operative or inoperative condition of such flashlamps.

More recently, and in order to obviate the necessity of an electrical source and circuit in photoflash apparatus, percussively ignitable flashlamps have been developed. Corresponding in some respects to cameras using electrically fireable flashlamps, cameras adapted to receive the percussively ignitable flashlamps have been provided with mechanical means for firing the lamp and for sensing the operative or inoperative condition of the lamp. Such mechanical mechanisms are disclosed, for example, in copending U.S. Pat. application Ser. No. 766,751, entitled "Percussion-Ignitable Flash Unit Having Contact-Actuatable, Pre-energized Strikers and Photographic Apparatus Using Such Units," filed on Oct. 11, 1968 in the name of Poweska et al.

Still more recently, it has been found particularly advantageous, in sensing and/or firing percussive flashlamps, to move the sensing and/or actuating member into contact with the lamp striker as soon as the lamp is positioned at the forwardly facing or firing position. Mechanisms for accomplishing this result, and certain of the particular advantages thereof, are disclosed in concurrently filed U.S. applications Ser. No. 850,701, entitled "Flash Firing and Sensing Mechanism for Camera or Attachment Adapted to Use Percussively Fireable Flashlamps," filed on Aug. 14, 1969 in the names of W. H. Horton and C. Michatek; and Ser. No. 850,125, entitled "Firing Mechanism for Percussively Ignitable Flashlamps," filed on Aug. 14, 1969 in the name of E. L. Sturm. Briefly, these latter mechanisms permit sensing of the flashlamp's operative or inoperative condition as soon as and for the entire period of time the flashlamp is in the forwardly facing position. Thus, the camera operator easily can detect such lamp condition when he picks up the camera and without having to risk an accidental exposure by partially depressing the camera body release or shutter actuating means.

Previously known flashlamp sensing and firing mechanism generally have been satisfactory for their intended purposes. However, under certain operating conditions, it is possible in mechanisms of the latter referred to type (disclosed in the above-mentioned Horton et al. and Sturm applications) to accidentally fire a flashlamp upon rotation thereof to the firing position. Moreover, this problem has been particularly difficult to solve because it results at least in part from the previously mentioned and important advantage in contacting or sensing the lamp striker as soon as the lamp reaches the forwardly facing position.

Referring more specifically and by way of example to these latter mechanisms, a sensing and actuating member is released upon the positioning of a flashcube on the camera, and moves upwardly through an opening in the cube base into sensing or light engagement with a striker wire lodged in a preenergized condition in the cube. Thereafter the actuating member can be impacted or struck to dislodge the striker wire and fire the cube. When the cube is indexed or rotated, camming means including a part of the cube itself, or of the cube receiving socket, temporarily withdraws the sensing and actuating member from the cube and until the next successive flashlamp is in the forwardly facing position. Then the sensing and actuating member is permitted to return to its raised position in sensing or light contact with the striker wire within the cube, and, under ordinary operating conditions, it will not effect firing of the flashlamp until the member again is impacted. However, under certain conditions, for example, when the cube is rapidly or continuously indexed, the velocity with which the actuating member returns to its striker contacting position will be sufficient to dislodge the striker and accidentally fire the lamp.

Dampening devices for preventing the above-mentioned firing of percussive flashlamps are disclosed in concurrently filed U.S. application Ser. No. 850,009, entitled "Dampening Control Device for Percussive Photoflash Firing Mechanism," filed in the names of E. L. Sturm and W. H. Horton. By way of example, one such device includes a stepped camming surface formed on and defined by an indexable flashlamp socket, and a cam follower or control arm cooperative with the camming surfaces for dampening or controlling movement of the actuating arm into nonreleasing engagement with the flashlamp striker as the flashlamp is indexed to the firing position. Such devices are entirely satisfactory under most operating conditions but are somewhat limited in application. Moreover, the camming surfaces and follower or control arm must be manufactured to relatively close tolerances of dimension and relative location.

SUMMARY OF THE INVENTION

It is, therefore, an object of the present invention to overcome the above-noted problems encountered with previously known mechanisms and to provide an improved flashcube or multilamp unit for supporting a plurality of flashlamps having preenergized striker wires for percussively firing such lamps.

A still further object of the present invention is to provide a flashcube of the above-mentioned type that is useable on a camera adapted to receive and index the flashcube, and that includes a sensing and/or actuating arm movable into the flashcube in response to rotation or indexing of the flashcube.

It is further an object of the present invention to provide a control or dampening step or ramp on the base of such a flashlamp for effecting stepwise movement of a camera actuating member into sensing or nonreleasing engagement with a preenergized lamp striker upon indexing of the flashcube.

In accordance with a preferred embodiment of the invention, a multilamp photoflash unit or flashcube is provided with a control or dampening device adapted to cooperate with a mechanical sensing and/or firing mechanism, to prevent accidental firing of the flashlamps upon indexing thereof. The multilamp units preferably contain, and include a base for supporting, a plurality of percussively ignitable flashlamps each having a preenergized striker for impacting and firing its respective flashlamp. The unit is particularly adapted to be received on and used with a camera including a mechanism having a sensing and/or actuating member that first is automatically moved into engagement with a striker in the unit, in response to positioning of a flashlamp at a firing locus, and thereafter is actuatable to dislodge the striker and effect percussively firing of the flashlamp. To permit indexing of the unit after firing, the actuating member may be temporarily withdrawn from the unit until the next flashlamp is positioned at the firing locus, at which time the member is adapted again to enter the unit to engage a striker wire. The present invention is for preventing accidental firing of the flashlamps upon such indexing and includes a control or dampening ramp or surface engageable by the camera mounted actuating member to effect a stepwise return or reentry of the member into nonreleasing engagement with a flashlamp in the unit upon indexing of the unit.

BRIEF DESCRIPTION OF THE DRAWINGS

FIG. 4 is a perspective schematic view of a sensing and actuating mechanism for sensing the condition of and percussively firing a flashcube of the type illustrated in FIGS. 2 and 3, and further depicting the cube socket and associated mechanism for withdrawing the sensing and actuating mechanism from the cube upon socket indexing.

DESCRIPTION OF THE PREFERRED EMBODIMENT

Figure 1:
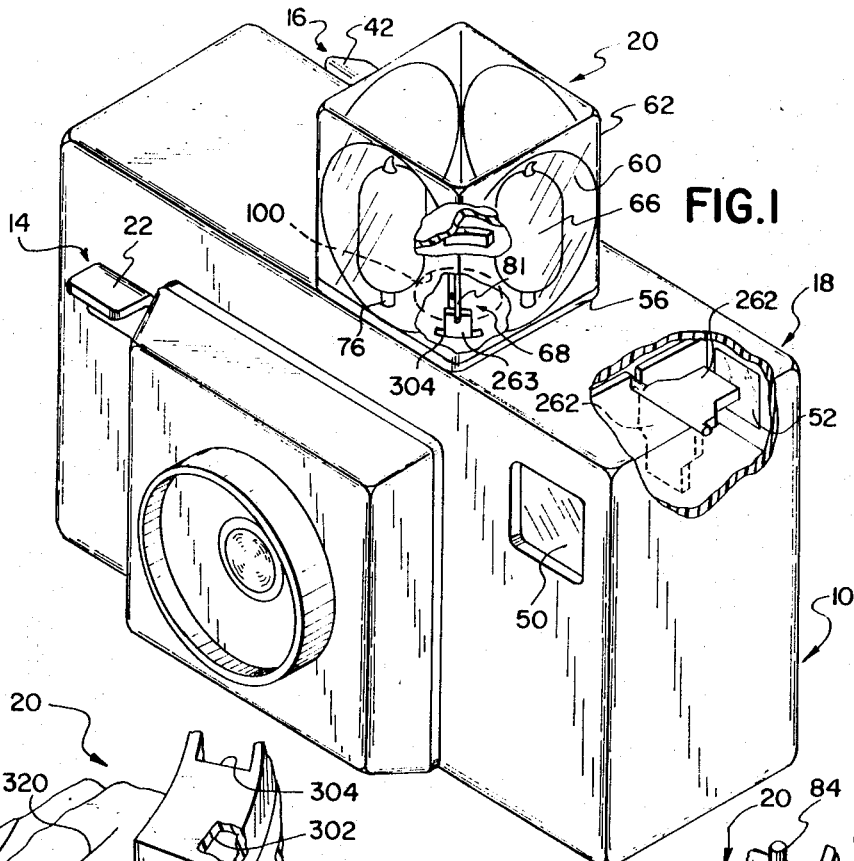
FIG. 1 is a perspective view of a multilamp flash unit or flashcube on a camera incorporating the present invention and illustrates a camera sensing or actuating member in engagement with a preenergized striker wire in the flash unit.

Referring now to the drawings, and particularly to FIG. 1, a camera for incorporating a preferred embodiment of the invention is illustrated comprising a camera casing 10, a body release or depression member 14 for effecting operation of the camera shutter 15 (FIG. 4), a film-winding member 16 and a viewfinder 18. As will be described more fully hereinafter, the camera is particularly adapted to receive a percussively ignitable flashcube 20 removably or detachably received on the camera and firable in synchronism with operation of shutter 15 by a mechanism 21 illustrated on FIG. 4.

GENERAL CAMERA FEATURES

The various camera mechanisms are more clearly disclosed in concurrently filed aforementioned U.S. application Ser. No. 850,125 (Sturm). Briefly, however, the preferred body release or depression member 14 comprises a depression or manually engageable surface 22, accessible from outside the camera casing 10, and a body portion 23 (FIG. 4) within the camera interior for latching or maintaining an impacting member such as a shutter driver in a first latched and cocked or energized position. The body release or depression member is movable by the manually engageable surface to effect release of the impacting member or shutter driver in the usual manner to actuate the camera shutter and various other camera mechanisms as will be described more fully hereinafter.

The shutter 15 is illustrated in FIG. 4 as a single-blade impact type, having an aperture covering member, such as blade 28, pivotally mounted in the camera or casing at 30. The shutter is normally maintained in a closed position against a stop by a hairpin spring or other energy storing means, and is adapted to be engaged or struck by the impacting member or shutter driver upon release thereof, to effect opening of the shutter and uncovering of the exposure aperture for the proper exposure period and in the usual manner.

Winding mechanism 16 is more clearly illustrated in concurrently filed Sturm U.S. application Ser. No. 850,125 entitled "Mechanism for Firing Percussively Ignitable Flashlamps." As disclosed in said application, the mechanism includes a handle and actuating member 42, (FIG. 1) accessible from the camera exterior and rotatable or oscillatable to advance film through the camera and to index or set various camera operating mechanisms such as the multilamp flash unit and the impacting member or shutter driver.

Viewfinder 18 is of a usual type, well known to those skilled in the art, and comprises a front window or focusing means 50, a back or viewing window 52, and sufficient space therebetween for receiving a signal means such as a translucent warning flag to be described more fully hereinafter.

THE MULTILAMP FLASH UNIT

Figure 2:
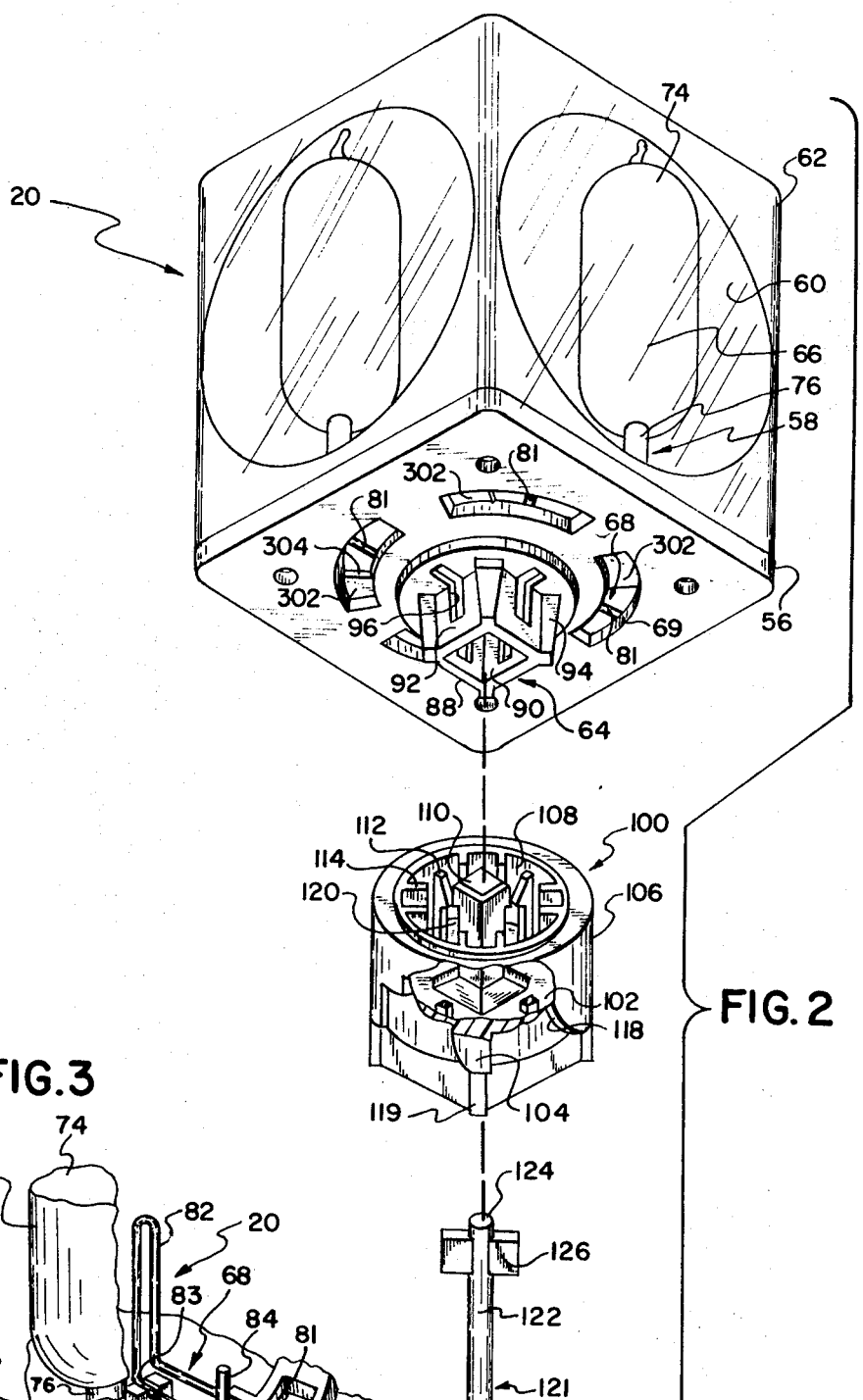
FIG. 2 is an exploded view of a percussively ignitable flashcube adapted to be received on the camera of FIG. 1, and of a socket construction for removably or detachably receiving such flashcube on the camera.
Figure 3:
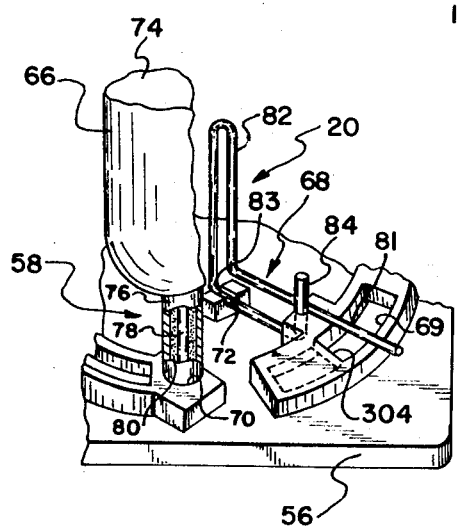
FIG. 3 is a partial perspective view of the flashcube of FIG. 2 with parts broken away to illustrate the interior of the cube including a flashlamp having a percussion sensitive tube or anvil and a preenergized striker wire for percussively striking the tube or anvil.

Referring now to FIGS. 2 and 3, and more particularly to the details of a multilamp flash unit or flashcube for supporting a plurality of preenergized flashlamp devices, the illustrated cube comprising a base 56 for supporting a plurality of percussively ignitable flash devices 58, reflecting means such as polished metal foil formed into concaved disks 60, a cover member of transparent material 62, and a support or indexing means such as post 64. Each flash device includes a flashlamp 66 and a pretensioned or preenergized striker 68 lodged over means in the cube base defining openings or slots 69 passing entirely through the base and into which a camera sensing or actuating member can be moved upwardly into contact with the striker wire to dislodge the same and fire the flashlamp. On one side of the base normally referred to as the upper face thereof, means are provided for securely supporting each of the flashlamps 66 and striker wires 68. As illustrated most clearly in FIG. 3, these means comprise a circular opening defining a bore 70, for receiving a portion of the flashlamp, and slots 72, for receiving a knee portion of the striker wire. The upper face of base 56 also may be provided with a stop member for maintaining the striker wire 68 in its tensioned condition. However, in the embodiment illustrated, the function of this stop member is provided by a bent portion of the striker wire itself, as will be described more fully hereinafter.

Each of the four flashlamps 66 comprises a hermetically sealed envelope 74 containing combustible material such as a zerconium foil in a combustion supporting atmosphere such as oxygen. The base or lower portion of envelope 74 is formed and sealed around an impact sensitive means such as an elongate soft or bendable tube 76 having a circular cross section and containing in spaced relation therein an anvil 78. In order to initiate combustion of the combustible material in envelope 74, a percussively ignitable material 80 is placed on anvil 78 or in the space between tube 76 and the anvil. Thus, tube 73 is adapted to be rapidly struck or impacted and deformed by striker wire 68 to fire the percussive material within the tube. Upon such firing the heat energy generated by ignition of the percussively ignitable material 80 conflagrates and is directed upwardly through the tube and into the envelope 74 to initiate combustion of the zirconium foil and thereby to fire the flashlamp. The lower or end portion of tube 76 further is shaped to cooperate with the circular hole or bore 70 defined in base 56 to securely support the flashlamp on the base.

The striker wire 68 is shown most clearly in FIG. 3 and comprises an elongated or striking leg 81 an upwardly bent central portion 82, adapted to be torsionally bent to energize the striking leg, a knee 83 for engaging the cube base to locate the striking wire on the base, and a second elongated leg including a bent end portion defining a stop 84 for maintaining the striking leg in the tensioned position. The elongated striking leg 81 is lodged and maintained by stop 84 over opening 69 in the base and is adapted to be engaged by the camera sensing or actuating member as previously mentioned to first sense the condition or position of the striker wire and thereafter to rapidly push or dislodge the striking leg upwardly over its respective stop 84 to release the striker and effect firing of the flashlamp.

The support or indexing means 64 is located on the other or lower face of base 56 from the flash devices and may be separately attached or integrally molded thereto. In the illustrated embodiment, the support or indexing means 64 includes a channel member 88 defining a square interior opening 90 and a substantially square external surface 92. At each of the four corners of the external surface, locating means 94 are provided comprising a rib having a tapered lowered portion and a substantially square upper portion. As will be described more fully hereinafter in connection with the camera socket, the ribs are first guided into the socket by the tapered portions until they are fully seated therein and then are held or maintained securely in their proper position relative to the socket by the upper square portions. Also provided on the outer surfaces of channel member 88, and between the ribs 94, are recessed or slot portions having a slightly tapered or inclined lower surface 96 for cooperating with the socket latching means also to be described more fully hereinafter.

THE SOCKET

Figure 5:
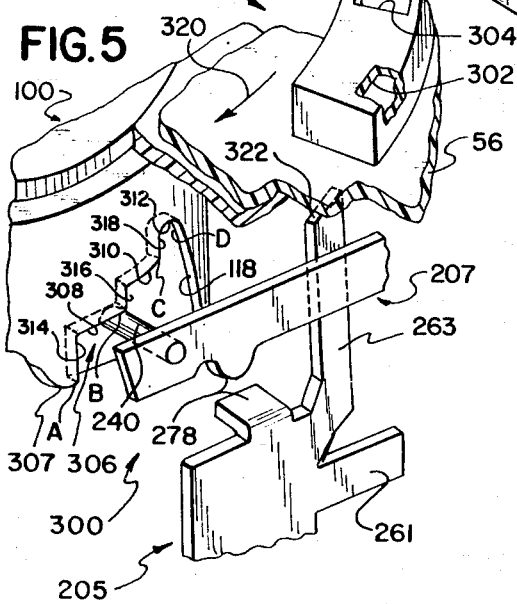
FIG. 5 is a partial schematic and perspective view of a control or dampening device in accordance with the present invention with parts broken away to illustrate socket and actuator structure for controlling the stepwise or dampened reentry of the actuator into the unit or cube.

Referring now to a preferred embodiment of socket depicted most clearly in FIGS. 2, 4 and 5, a cylindrical member 100 is illustrated defining a socket base 102 and walls 104 extending upwardly therefrom to define socket exterior surfaces 106 and interior surfaces 108. Extending upwardly from the interior portions of base 102 are a square post member 110, adapted to cooperate with the internal surfaces 90 of the cube channel member 64, and a plurality of flexible fingers 112, adapted to cooperate with the latching surfaces 96 on the exterior portion 92 of the channel member 64. Also extending in substantially the same direction as post 110 and fingers 112 are channel defining means such as splines 114 adapted to cooperate with the cube ribs 94 to accurately and securely maintain the cube in a predetermined position of orientation in the socket. These splines are thin walled and flexible to compensate for manufacturing tolerances in molding the socket. For example, if the socket splines (and/or cube ribs) are not exactly located at 90° from each other, the splines still can flex somewhat to receive the cube in a proper manner. Moreover, if desired, the socket splines can be formed purposefully to flex outwardly and pinch the cube ribs to even more securely hold and locate the cube in the socket even when the manufacturing tolerances are accurate.

The external surfaces 106 of the socket are provided with, or have attached or coupled thereto, camming means 116 having a steeply inclined surface 118 on at least one side thereof, as will be more fully described hereinafter in connection with the present invention. Abutment or indexing means 119 also are provided to cooperate with socket indexing means operated by the film-winding mechanism briefly mentioned above.

Upon inserting a flashcube into the socket, the aligning post 110 in the socket engages the interior 96 of cube channel member 64 to initially align the cube relative to the socket and to insure that the cube is oriented in a proper angular relationship with respect to the socket. Similarly, the lower or tapered portions of ribs 94 engage and initially orient the cube within the socket splines 114. As the cube further is pushed to its final position in the socket, the central socket post 110 engages interior portions of the cube channel member 64 to prevent tilting of the cube relative to the socket, and the upper or square portions of ribs 94 engaged and closely cooperate with the internal surfaces of the socket to accurately and securely orient the cube. Also during the final stages of cube positioning, the socket latching fingers 112 engage the cube latching surfaces 96 to securely but releasably hold or maintain the cube in the socket. As described more fully in U.S. Pat. No. 3,407,717, issued on Oct. 29, 1968 in the name of P. J. Ernisse, these latching fingers further may be provided with cam or tapered end surfaces for biasing the cube downwardly into the socket.

For a purpose to be described more fully hereinafter, in connection with FIG. 4, the socket post 110 further includes means defining cutout sections or slots 120 (FIG. 4) passing entirely through the post to a hollow post interior or bore (not shown). This interior is adapted to slidably receive a cube sensing member or T-bar 121 having a body portion 122 and an upper end or portion 124 with cube engaging blades or flanges 126. In an assembled condition, blades 126 are adapted to extend from the post interior, through slots 120, and into the socket interior where they will be engaged by the cube channel member 64 when the cube is positioned in the socket. Normally, the T-bar is resiliently biased to a first or raised position and is cammed or pushed downwardly to a second and lowered or retracted position upon positioning of a cube in the socket, thereby to set or adjust certain camera mechanisms as will be described more fully hereinafter in connection with such mechanisms.

IMPACTING MEMBER OR SHUTTER DRIVER

The impacting member or shutter driving member 129 (FIG. 4) comprises a main body portion 132 pivotally mounted within the camera casing, and a leg or extension 134, including a driving portion 136, adapted to rapidly strike or drive the shutter blade to its open position in a manner known to those skilled in the art. As previously mentioned, the driving member is set or cocked, for example, by oscillation of film winding member 42, to a first or energized position illustrated in FIG. 4, and then may be released by the body or shutter release 16 to rapidly move into striking or impacting engagement with the shutter blade to open the blade against the force of its shutter return spring (not shown). The shutter blade then rotates in a clockwise direction (FIG. 4) until its direction of movement is reversed either by the return spring or a shutter stop (not shown), at which time the spring again returns the blade to its closed position over the camera aperture. Of course, the speed, or amount of time during which the aperture is opened is determined by the resiliency of the return spring and/or the position of a shutter stop. Further features and functions of this driver member will be described hereinafter in connection with the flash firing mechanism.

FLASH FIRING MECHANISM

Referring now more particularly to FIG. 4, the flash sensing and/or firing mechanism includes the previously mentioned releasing means or T-bar 121, a bell or latching and setting member 203, a sensing or actuating member 205, a camming or retracting mechanism 207, a signal mechanism 209, shutter speed changing means 211, and a force transmitting arm or striking lever 213.

In this preferred embodiment, these mechanisms both sense the operative or inoperative condition of the flashlamp and effect firing of the flashlamp, but it should be understood that the present invention could be used with a similar mechanism for accomplishing either of these functions alone.

As will be described more fully hereinafter, these mechanisms are maintained in inactive positions (not shown) prior to positioning of the cube on the camera. However, for present purposes the mechanism will be described mainly in connection with FIG. 4, which illustrates these mechanisms in the positions they will assume after a cube having an operative striker wire at the firing locus has been positioned on the camera. Prior to positioning of the cube on the camera, T-bar 121 is maintained in an upper or raised position within the socket post 110 and the various other sensing and actuating elements, such as actuating member 205, are retained in retracted or inactive positions. However, when a cube is inserted into the socket, the T-bar is moved to a lowered or releasing position, by engagement between the cube indexing member 64 and the T-bar fins 126, to release these elements to the positions illustrated.

Bell or setting member 203 is mounted within the camera, for example, by means of a mechanism plate 217, and includes a central portion 219 having suitable means mounting the member for pivotal movement between a first clockwise and latching position and a second counterclockwise and unlatching or releasing position. One end of the member 203 is provided with a projection or abutment 223 adapted to be engaged by the lower end of the T-bar 121, as described above, for rotating the setting member to its counterclockwise and releasing position (FIG. 4) in response to the positioning of a cube on the camera. The other end or leg of the setting member 203 is provided with a bent lug 225 supporting a resilient means or spring 227, and an abutment surface 229 for articulate coupling of the setting member to the camming or retracting mechanism 207. When no cube is positioned on the camera, spring 227 serves to maintain both the setting member 203 in its clockwise and latching position and the T-bar in its raised or extended position.

The camming or retracting mechanism 207 also is mounted on mechanism plate 217 and is provided with a central portion 230 including suitable means 232 for pivotally mounting the mechanism within the camera. A first end or leg 234 of the camming or retracting mechanism is provided with a surface 236, or other means, defining an articulate connection with the setting member 203, while a second end leg or arm 238 of the camming and retracting mechanism includes a camming surface or extension 240 adapted to be received in and follow the camming means 116 of the socket. As will become more apparent hereinafter, the camming mechanism is movable between first or retracted positions and second or extended positions, either in response to movement of the socket and its cam surfaces 116 or in response to movement of the setting member 203. The shutter speed changing mechanism 211 is more fully described and illustrated in the aforementioned concurrently filed Sturm application Serial No. 850,125. Briefly, however, this mechanism comprises an arm 241 pivotally mounted within the camera casing at 242 by any suitable means, and includes a first leg 246 having a cutout portion or slot 248 adapted to receive the bent lug 225 of the bell or setting member 203. The other leg 250 includes an abutment or shutter stop (not shown) briefly mentioned hereinabove and adapted in one position to be engaged by the shutter blade to provide one speed of shutter operation. In another or second position of the speed changing lever, the stop is moved to a position where it will not be engaged by the shutter blade, to provide another or a different speed of shutter operation. As will become more apparent hereinafter, the speed changing lever is moved between its respective positions be bell or setting and latching member 203 and in response to the positioning (or removal) of a flashcube in the socket.

The sensing or actuating member 205 includes an elongated body portion 254 including first and second pins 256, 257 received through slots 258 in the mechanism plate and mounting the member for longitudinal or sliding movement relative to the mechanism plate and camera body. Moreover, one of these pins 257 further is adapted to be engaged by striking lever 213 to effect firing of a flashlamp, as will be described more fully hereinafter. At an upper portion of the actuating member, first and second legs 261 and 263 are provided, respectively, for engaging a bent leg 264 of the signal mechanism 209, and for engaging the striker wire 81 in the flashcube to sense and dislodge the same.

Signal mechanism 209 comprises a signal or flag 262 and an articulate linkage 265 for coupling the flag to the sensing and actuating member 205 and for pivotally mounting the flag, for example, on the mechanism plate. At one end, the articulate connection includes the bent leg 264, adapted to engage the first leg 261 of the sensing or actuating member, while the other end of the connection includes a forked leg 267 for receiving a bellcrank member 269 of flag 262. In operation the flag is movable by the linkage 264 between a first or retracted position and a second position in which it extends into view in the camera viewfinder. In this second position the warning flag is intended to signal the camera operator and warn him of the fact that the flashlamp in the firing position is inoperative, for example, because it has already been fired.

Striking lever 213 is mounted on the mechanism plate 217 or within the camera casing by means of a pivot pin 271 extending through a central portion of striking lever to pivotally mount the lever on the mechanism plate. One end portion of the striking lever includes a bent camming arm or striking surface 273 adapted to be impacted or driven by a hammer member or striking abutment 275 on the shutter driver, as will be described more fully hereinafter. The other end of the striking lever defines a leg 277 adapted to contact the pin 257 of the actuating member to effect rapid movement of the actuating lever to a raised position for dislodging the cube striking wire 78 and firing the cube. As also will be described more fully hereinafter, in connection with the operation of the sensing and firing mechanism, the arm is adapted to assume or move between any one of three positions "a," "b" or "c" depending respectively on whether a cube is positioned on the camera and, if so, whether or not the forwardly facing flashlamp is operative.

OPERATION OF SENSING AND FIRING MECHANISM

Referring now to the operation of the above-described mechanism, prior to the positioning of a flashcube on the camera the setting or latching lever 203 will be maintained in its clockwise and latching position "a" by relatively strong spring 227. In this position one end of the lever maintains T-bar 121 in its extended or raised position within the cube while the other end of the lever holds or latches the camming mechanism 207 in its counterclockwise or withdrawn position. Similarly, the camming mechanism 207 engages and blocks the actuating and sensing arm 205 at 278 and thereby holds the arm in a lowered or retracted position wherein the arm is enclosed entirely within the camera casing to protect the arm. With the arm in this lowered or retracted position "a" the pin member 257 thereon secures the striking lever 213 in a most counterclockwise or inactive position wherein it will not be impacted or engaged by the hammer 275 upon shutter actuation. Moreover, the first leg portion of the sensing and actuating member will maintain the signal or flag 262 in a raised position out of view in the camera viewfinder. Still further, so long as the bell or setting and actuating lever 203 is maintained in this clockwise position, it will hold the shutter speed changing lever 211 in its most clockwise position wherein its abutment or shutter stop will be engaged by the shutter to effect shutter operation at its faster speed appropriate for daylight exposures.

When a flashcube is positioned on the camera, and the forwardly facing flashlamp thereof is in an operative condition, the cube will engage T-bar 121 and move the T-bar to its lowered or retracted position (FIG. 4), thereby rotating the setting or latching lever 203 in a counterclockwise direction and releasing the camming mechanism 207 and sensing or actuating arm 205. Thereupon the sensing and actuating arm will move to its raised or extended position in engagement with a preenergized striker wire 81 associated with the forwardly facing flashlamp. With movement of the sensing and actuating arm to the raised position, the flag linkage 264 will pivot the flag somewhat toward the lowered or retracted position thereof. However, such pivotal movement will not be sufficient to move the flag to a visible position in the camera viewfinder. Similarly, the striking lever 213 follows pin 257 and moves in a counterclockwise direction until the striking or camming surface 273 thereof is positioned at a location "b" (FIG. 4), where it will be impacted or struck by the hammer member 275 when such driver is released. Thus, when the body release 16 is depressed, and the shutter driver rapidly moves to its second or released position, it will synchronously effect an exposure and fire the flashlamp by striking both the shutter blade and the force transmitting or striking lever 213, thereby opening the shutter and moving the sensing and actuating arm 205 to its fully raised position. Moreover, with the bell or sensing and latching lever 203 in this counterclockwise position, the shutter speed changing lever 211 will be rotated to move the shutter stop to its second or inoperative position where it will not be engaged by the shutter blade upon actuation thereof. Therefore, the shutter speed will be adjust to a longer cycle or speed appropriate for flash exposure.

When a cube is position on the camera with an inoperative forwardly facing flashlamp, the sensing and actuating member 205 will be released as described above to move to its raised position, but, in this case, will move to an overextended position beyond where it ordinarily would engage the preenergized striker. In this position of the sensing arm the first leg 261 thereof will effect movement of the signal or flag 262 even further into the viewfinder where it will be visible by the camera operator to warn of an inoperative flashlamp. Moreover, the striking or cam surface 273 of striker lever 213 will be moved to an even farther counterclockwise position "c" where it again will not be engaged by hammer member 275 of the shutter driver when such driver is released to expose film in the camera.

After firing the flashlamp the camera is prepared for the next picture taking operation by winding of film as set forth hereinabove. Upon such film winding the flashcube socket is indexed or rotated to position the next flashlamp in the forwardly facing position or firing locus. In order to permit such rotation, the sensing and actuating finger is withdrawn from the cube by engagement between the camming surfaces 116 on the socket and the cam follower or projection 240 of camming mechanism 207. As the socket is rotated, this camming device withdraws or forces the camming mechanism 207, and along with it the sensing and actuating member 254, to a lowered position wherein the actuating arm 263 is below the cube base. The sensing and actuating member will remain in this lowered position as the cube and socket are rotated and until the next flashlamp is positioned in the firing locus, at which time the camming surfaces 118 again permit the camming mechanism and sensing and actuating arm to move upwardly into engagement with the next preenergized striker wire.

CONTROL OR DAMPENING DEVICE

Referring now more particularly to the present invention, and to FIGS. 2, 3 and 5–8, a control or dampening device 300 is illustrated for preventing the accidental firing of a flashlamp 20 upon indexing or rotation of the flashlamp. While the present invention relates to the multilamp unit, per se, this unit particularly is adapted for use with a camera actuating mechanism of the type illustrated and, for clarity, will be described with this mechanism.

As more generally described hereinabove, the flashlamp unit comprises a base 56 supporting a plurality of flashlamp devices 58. Each such device includes a flashlamp 66 and a preenergized striker 68 releasable through an opening 69 in the base to impact and percussively fire the flashlamp. More specifically, the base 56, or at least the lower surface thereof, is substantially flat or planar and includes a recess or notched portion defining a ramp surface 302 adjacent one end 304 of each opening 69 in the base. This ramp surface is spaced upwardly from the bottom or lowermost surface of the base to provide an axially oriented step with the ramp portion 302 thereof axially closer to the striker wire than the lowermost base surface. In the preferred embodiment, for example, the base is approximately 0.135 inches thick adjacent openings 69 and the ramp 302 is raised approximately 0.110 inches from the lowermost base surface. Thus, if the flashlamp striker wire lies or is latched adjacent the upper base surface, ramp 302 will be axially spaced approximately 0.025 inches from the striker wire. With such a flashlamp unit, and as described more fully hereinafter, it is possible to resiliently urge a camera mounted actuating member into engagement with the base during indexing such that the member will be moved stepwise from the lowermost base surface to the ramp and then into engagement with the flashlamp striker without dislodging or releasing the striker.

Referring now more particularly to the manner of using the cube with a camera mechanism, the dampening device 300 includes an additional camming or control structure 306, on or associated with the socket, and the camming mechanism 207 and actuating member 205 described hereinabove in connection with the firing and indexing mechanisms. The additional camming structure comprises means defining various stepped surfaces or camming reaches including a first and lowermost slide or reach 307 adjacent the socket base, second and third slides or reaches 308, 310, and an uppermost recess 312 leading into retracting cam 118. Between the above-mentioned camming reaches are stepped portions or sides 314, 316 and 318, respectively, for interconnecting the reaches to form a continuous and endless control surface with the retracting cam 118.

Figure 6:
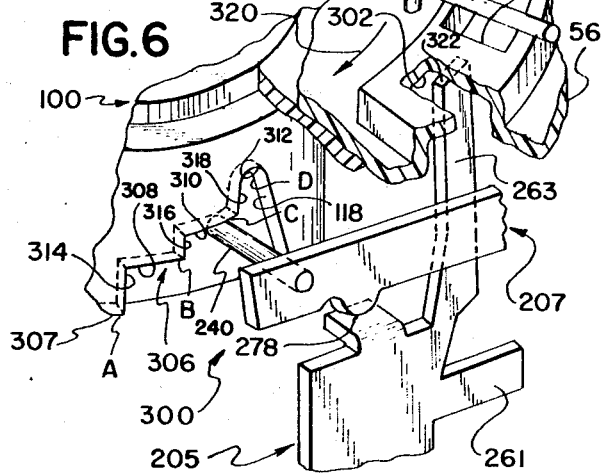
FIG. 6 is a partial schematic and perspective view similar to FIG. 5 but depicts the control or dampening device in a different position of operation.
Figures 7, 8:
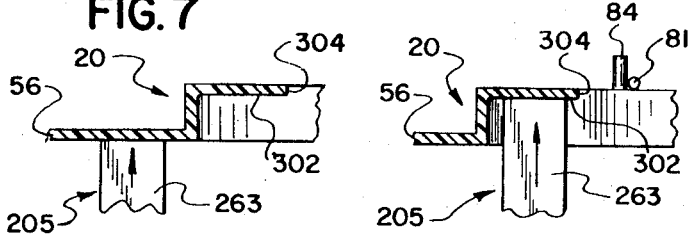
FIG. 7 is a partial view of the multilamp unit and actuating member illustrating the relative positions of the unit and member when the control and dampening device is in a position of operation corresponding to FIG. 5.
FIG. 8 is a partial view similar to FIG. 7 but corresponding to the position of operation depicted in FIG. 6.

In operation, and upon rotation of the socket to index the flashlamps, the actuating member 205 first will be withdrawn from the multilamp unit, by the retracting cam 118, until the lowermost camming reach or slide 307 is engaged by follower 240. At this time or position of rotation, the actuating member will be fully withdrawn from the unit by engagement at point 278 between the camming mechanism 207 and the actuating member 205. Now upon further rotation of the socket, follower 240 will drop off first step 314 under the action of spring 277 (FIG. 4) and will engage camming reach 318, as illustrated in FIGS. 5 and 7. In this position of follower 240, the camming mechanism will not engage or block the actuating member at point 278, and the actuating member will be free to move upwardly into engagement with the lowermost surface of the cube base 56. Thus, the position of the actuating member will be determined substantially entirely by the cube base and independently of the camming mechanism. Still further socket rotation will align camming reach 310 over the follower 240, and the follower will drop off step 316 to engage the reach 310 (FIG. 6). Simultaneously therewith, the actuating arm will approach the edge of ramp 302 and will drop off the lowermost base surface onto the ramp surface (FIGS. 6 and 8). While step 316 will approach the follower 240 at approximately the same time the edge of ramp 302 approaches the actuating member, the follower and attached camming mechanism 205 preferably will engage and be partially arrested by the socket camming reach 310 before the actuating member 205 engages the cube ramp 302. This is due in part to the selected spring pressures acting on the camming mechanism and actuating member, but even more importantly is due to the fact that the cam step 316 is shorter than the ramp step. The mechanism 205 therefor has less distance to travel than the follower 240 and ordinarily will engage the camming reach 310 before the actuating member engages the ramp 302. In any event, the various structures are arranged such that, in this FIG. 6 position of rotation, the camming mechanism and actuating member again are engaged at point 278. At the final indexing stages, the follower 240 and actuating arm slip off cam reach 310 and ramp 302, and move toward recess 312 and into opening 58, respectively. During these final stages the socket camming mechanism, and particularly the last cam step 318 thereof, substantially entirely controls movement of the arm slowly upwards until the arm nonreleasably engages and is blocked by the flashlamp striker wire 78. The camming mechanism then again separates from the actuating member at point 278 as the mechanism follower 240 continues toward the upper limits of recess 312 after the actuating member has been flashed by the striker wire. Thus, in the fully indexed or detented position of the socket, the camming mechanism will be spaced from the actuating member and will not interfere with the rapid upward and striker dislodging movement of the member upon firing of the flashlamp.

While the present invention has been described in connection with camera mechanisms utilizing socket camming structure, it should be apparent that the cube damping structure also would be useful with other camera mechanisms disclosed, for example, in concurrently filed U.S. Pat. application Ser. No. 850,701, entitled FLASH FIRING AND SENSING MECHANISM FOR CAMERA OR ATTACHMENT ADAPTED TO USE PERCUSSIVELY FIREABLE FLASHLAMPS, and filed in the names of W. H. Horton and C. Michatek.

The invention has been described in detail with particular reference to a preferred embodiment thereof, but it will be understood that variations and modifications can be effected within the spirit and scope of the invention.

I claim:

1. Control structure in a multilamp flash unit; the unit being indexably receivable on apparatus having a mechanical actuating member for sequentially firing flashlamps in the unit; the unit including a base having a substantially planar first base surface, and a second base surface spaced from the first surface for supporting the flashlamps and for supporting preenergized strikers individually releasable to fire a respective flashlamp; the base further having means defining an aperture adjacent each striker and through which the adjacent striker is accessible first to be nonreleasably engaged by and then to be released by the actuating member to fire a respective flashlamp; the control structure comprising:

a ramp on the base and adjacent each opening, said ramp defining a third surface spaced between the second and first base surfaces, said ramp being adapted to be engaged by the actuating member during indexing of the unit on the apparatus to effect stepwise movement of the member into nonreleasing engagement with the striker.

2. A base for a multilamp flash unit; the unit including a plurality of flashlamps each having a preenergized striker individually releasable to fire its respective flashlamp; the unit further being indexably receivable on apparatus having a mechanical actuating member first resiliently movable into the unit to sense the condition of a flashlamp striker and thereafter drivable to release the sensed striker and fire its respective flashlamp; the base comprising:

means defining substantially planar first and second axially spaced surfaces, said second surface supporting the flashlamps and the preenergized strikers;

means defining an aperture in the base adjacent each striker and through which aperture the striker is accessible first to be nonreleasably engaged by the actuating member to sense the condition of the striker and then to be released by the actuating member to fire its respective flashlamp; and, a ramp on the base adjacent each opening, said ramp defining a third surface axially spaced toward the second surface from said first surface, said ramp being adapted to be resiliently engaged by the actuating member during indexing of the unit and for effecting stepwise movement of the member from the first base surface to the ramp and then into the opening to nonreleasably engage a respective striker.

3. A base as claimed in claim 2 wherein the first and second surfaces are spaced from each other by substantially 0.130 inch and the third surface is spaced toward the second surface from the first surface by substantially 0.105 inch.

4. A multilamp flash unit receivable on apparatus including an actuating member; the unit comprising:

a substantially planar base defining upper and lower spaced surfaces and an aperture through the base;

a plurality of flashlamp devices supported on the upper surface of said base, each device including a flashlamp and a preenergized striker individually releasable to impact against and fire a respective flashlamp, said striker including a portion located closely adjacent said second surface and over said aperture first to be nonreleasably engaged by and then to be released by the actuating member to fire the flashlamp; and, an actuator arresting ramp on the base and adjacent each opening, said ramp defining a surface spaced between said upper and lower surfaces and being adapted to be engaged by the actuating member, whereby the actuating member can be moved first into engagement with the lower base surface and then into engagement with the ramp surface to effect stepwise movement of the actuating member into nonreleasing engagement with the striker.